May 20, 1930.  P. GREENWOOD  1,759,694
SEAT BACK REST
Filed Nov. 2, 1928
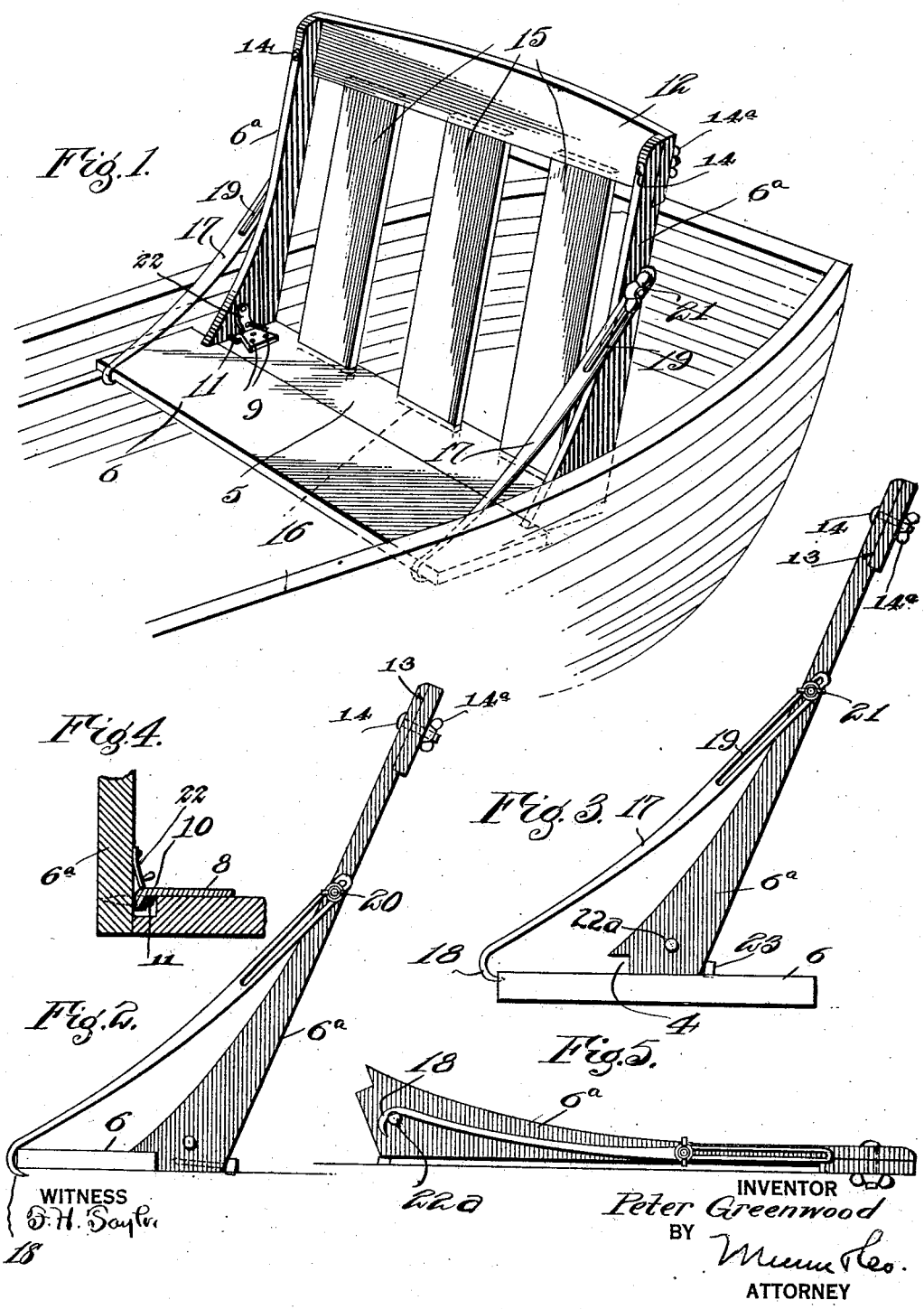

Patented May 20, 1930

1,759,694

UNITED STATES PATENT OFFICE

PETER GREENWOOD, OF SAWYER, WISCONSIN

SEAT-BACK REST

Application filed November 2, 1928. Serial No. 316,739.

My invention relates to back rests for seats, and an object of the same is to provide a collapsible back rest for association with board seats, such as are employed in row-boats and bleachers, etc.

Further the invention provides a back rest which will be detachable and effectively secured to a board seat, so as to produce a comfortable and rigid seat structure.

With the preceding and other objects and advantages in mind, the invention consists in the novel combination of elements, constructions and arrangements of parts and operations to be hereinafter more fully described, claimed and illustrated in the accompanying drawing, wherein:

Figure 1 is a perspective view of the invention associated with a row-boat seat, Figure 2 is a side elevation of the device associated with a board seat, Figure 3 is a similar view illustrating the application of the back rest when the board seat is of increased thickness and width, Figure 4 is a fragmentary sectional detail view, and Figure 5 is a side elevation of the device in collapsed position.

Referring to the invention in detail, a horizontal panel 5 to be arranged in abutting relation to a board seat 6 to constitute a continuation thereof is provided. Arranged at the ends of the panel 5 is a pair of side members 6$^a$, which are hingedly connected to the panel by hinge connections. These hinge connections consist of metal straps 8 riveted or otherwise secured, as at 9, to the upper face of the panel 5 at its ends. The straps 8 are formed with hook elements 10, which engage laterally projecting U-shaped staples 11 projecting from the inner faces of the side members adjacent their lower ends. Notches 4 are formed in the forward edges of the side members at their lower ends which accommodate the rear longitudinal edge of the board seat 6.

A horizontal cross bar 12, having its ends received in recesses 13 in the upper ends of the side members, is provided. Bolts 14 extend transversely through the upper ends of the hinged side members and the ends of the cross member to hold the latter to the side members. Wing nuts 14$^a$ are received on the projecting ends of the bolts and bear against the rear face of the cross bar.

A plurality of spaced vertical bars 15 extend from the panel to the horizontal cross bar, and are removably associated with these parts by having their ends accommodated in coinciding vertically alined recesses 6 in the cross member and panel, respectively.

For the purpose of supporting the back rest in a vertical position, parallel angularly disposed supporting arms 17, terminating in hooks 18 at their lower ends, are associated with the side members. These arms 17 are formed with longitudinal slots 19 at their upper ends through which lateral threaded studs 20, carried by the side members, project. Wing nuts 21 are associated with these studs for holding the arms in operative and inoperative positions. When the arms are arranged in inoperative position, the hook elements engage lateral studs 22$^a$ projecting from the side members at their lower ends.

When the device is used, as shown in Figures 1 and 2, the hook elements 18 embrace the forward longitudinal edge of the board seat. When, however, the board seat is of a greater thickness than the one disclosed in Figures 1 and 2, the points of the hook elements will penetrate the forward edge of the board seat, as illustrated in Figure 3. To relieve the back rest of rearward strain when used in this manner, lateral heads or blocks 23 project from the rear edges of the side members at their lower ends to rest directly upon the upper face of the board seat 6.

When it is desired to collapse the back rest, the cross bar 12 is first removed, and the bars 15 disengaged from the panel 5. After the arms 17 have been adjusted to lie parallel to the side members 6, as disclosed in Figure 5, these side members may be folded one upon the other to lie upon the panel 5. As the bars 15 and cross member 12 are substantially of the same contour, they may be stacked or superimposed upon the folded side members, and secured thereon in any desired manner.

For the purpose of preventing the hook elements 10 from becoming accidently disengaged from the staples 11 while the seat is being set up for use, pivoted latches 22 are carried by the inner faces of the side members 6ª adjacent their lower ends and are adapted to be swung against the straps 8 as illustrated in Figures 1 and 4.

What is claimed is:

1. In a detachable back rest for board seats, a panel to be arranged in abutting relation to the seat, a vertical back rest carried thereby, and means for attaching the back rest to the board seat with said panel abutting an edge of the seat and in the same plane therewith.

2. In a detachable back rest for board seats, a panel to be arranged in abutting relation to the seat, a vertical back rest carried thereby, and arms carried by the back rest and engageable with the forward longitudinal edge of the seat to attach the panel to the seat with said panel abutting an edge of the seat and in the same plane therewith.

3. In a detachable back rest for board seats, a panel to be arranged in abutting relation to the seat, a vertical back rest carried thereby, and arms pivotally carried by the back rest and terminating in hook elements at their lower ends for engagement with the forward edge of the seat to attach the panel to the seat with said panel abutting an edge of the seat and in the same plane therewith.

4. In a detachable back rest for board seats, a panel to be arranged in abutting relation to the seat, a vertical back rest carried thereby, and arms pivotally and longitudinally adjustably connected with the back rest at opposite sides and terminating in hook elements at their lower ends for engagement with the forward edge of the seat to attach the panel to the seat with said panel abutting an edge of the seat and in the same plane therewith.

Signed at Sturgeon Bay, in the county of Door and State of Wisconsin, this 15th day of October, A. D. 1928.

PETER GREENWOOD.